(12) United States Patent
Choi et al.

(10) Patent No.: US 8,139,665 B2
(45) Date of Patent: Mar. 20, 2012

(54) WIRELESS COMMUNICATION SYSTEM WITH MULTIPLE TRANSMISSION ANTENNAS USING PILOT SUBCARRIER ALLOCATION

(75) Inventors: Jin Soo Choi, Anyang-Si (KR); Jin Sam Kwak, Anyang-Si (KR); Bin Chul Ihm, Anyang-Si (KR); Wook Bong Lee, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 462 days.

(21) Appl. No.: 12/427,328

(22) Filed: Apr. 21, 2009

(65) Prior Publication Data
US 2010/0020890 A1    Jan. 28, 2010

Related U.S. Application Data

(60) Provisional application No. 61/082,820, filed on Jul. 22, 2008, provisional application No. 61/099,211, filed on Sep. 23, 2008, provisional application No. 61/089,565, filed on Aug. 18, 2008.

(30) Foreign Application Priority Data

Feb. 5, 2009  (KR) .................. 10-2009-0009390

(51) Int. Cl.
*H04L 27/28* (2006.01)
(52) U.S. Cl. ........................ 375/260; 375/285
(58) Field of Classification Search .................. 375/260, 375/285
See application file for complete search history.

(56) References Cited

U.S. PATENT DOCUMENTS

| | | | |
|---|---|---|---|
| 2005/0286408 A1 | 12/2005 | Jin et al. | |
| 2007/0104283 A1 | 5/2007 | Han et al. | |
| 2009/0067522 A1* | 3/2009 | Kwak et al. | 375/260 |
| 2009/0067534 A1* | 3/2009 | Kwak et al. | 375/267 |
| 2009/0225722 A1* | 9/2009 | Cudak et al. | 370/330 |
| 2009/0257520 A1* | 10/2009 | Lin et al. | 375/260 |
| 2009/0262696 A1* | 10/2009 | Wei et al. | 370/329 |
| 2009/0262848 A1* | 10/2009 | Choi et al. | 375/260 |
| 2011/0026482 A1* | 2/2011 | Li et al. | 370/329 |
| 2011/0096867 A1* | 4/2011 | Kang et al. | 375/295 |

FOREIGN PATENT DOCUMENTS

| WO | WO 2004/001545 A2 | 12/2003 |
|---|---|---|
| WO | WO 2006/004355 A1 | 1/2006 |

* cited by examiner

*Primary Examiner* — Shuwang Liu
*Assistant Examiner* — David Huang
(74) *Attorney, Agent, or Firm* — Birch, Stewart, Kolasch & Birch, LLP

(57) ABSTRACT

A method of allocating pilot subcarriers in a resource block for a wideband wireless mobile communication system with multiple transmission antennas using orthogonal frequency division multiplexing (OFDM) modulation is disclosed. In this method, pilot subcarriers are allocated to the resource block comprised of five (5) or seven (7) OFDM symbols so that only four (4) OFDM symbols of the resource block are allocated for pilot subcarriers.

12 Claims, 17 Drawing Sheets

FIG. 8
Related Art

OFDM symbol index j →

Subcarrier index i=I(k)

| | 0 | 1 | 2 | 3 | 4 | 5 |
|---|---|---|---|---|---|---|
| 0 | P0 | | | P0 | | |
| 1 | P1 | | | P1 | | |
| 2 | | | | | | |
| 3 | | | | | | |
| 4 | | | | | | |
| 5 | | | | | | |
| 6 | | | | | | |
| 7 | | | | | | |
| 8 | | | P0 | | | P0 |
| 9 | | | P1 | | | P1 |
| 10 | | | | | | |
| 11 | | | | | | |
| 12 | | | | | | |
| 13 | | | | | | |
| 14 | | | | | | |
| 15 | | | | | | |
| 16 | | P0 | | | P0 | |
| 17 | | P1 | | | P1 | |

FIG. 9
Related Art

OFDM symbol index j →

| | | 0 | 1 | 2 | 3 | 4 | 5 |
|---|---|---|---|---|---|---|---|
| Subcarrier index i=I(k) ↓ | 0 | P0 | P1 | | | P0 | P1 |
| | 1 | | | | | | |
| | 2 | | | | | | |
| | 3 | | | | | | |
| | 4 | | | | | | |
| | 5 | P1 | P0 | | | P1 | P0 |

FIG. 10
Related Art

OFDM symbol index j →

| | | 0 | 1 | 2 | 3 | 4 | 5 |
|---|---|---|---|---|---|---|---|
| Subcarrier index i=I(k) ↓ | 0 | P0 | | | | P0 | |
| | 1 | P1 | | | | P1 | |
| | 2 | | P0 | | | | P0 |
| | 3 | | P1 | | | | P1 |

FIG. 11
Related Art

OFDM symbol index j →

| | | 0 | 1 | 2 | 3 | 4 | 5 |
|---|---|---|---|---|---|---|---|
| Subcarrier index i=I(k) ↓ | 0 | P0 | | | | P1 | |
| | 1 | P1 | | | | P0 | |
| | 2 | | P0 | | | | P1 |
| | 3 | | P1 | | | | P0 |

FIG. 12
Related Art

OFDM symbol index j

| | 0 | 1 | 2 | 3 | 4 | 5 |
|---|---|---|---|---|---|---|
| 0 | P0 | P2 | | | P1 | P3 |
| 1 | | | | | | |
| 2 | | | | | | |
| 3 | | | | | | |
| 4 | | | | | | |
| 5 | P1 | P3 | | | P0 | P2 |
| 6 | | | | | | |
| 7 | | | | | | |
| 8 | | | | | | |
| 9 | | | | | | |
| 10 | | | | | | |
| 11 | | | | | | |
| 12 | P2 | P0 | | | P3 | P1 |
| 13 | | | | | | |
| 14 | | | | | | |
| 15 | | | | | | |
| 16 | | | | | | |
| 17 | P3 | P1 | | | P2 | P0 |

Subcarrier index i=I(k)

FIG. 13

OFDM symbol index j

| | 0 | 1 | 2 | 3 | 4 |
|---|---|---|---|---|---|
| 0 | P0 | P1 | | P0 | P1 |
| 1 | | | | | |
| 2 | | | | | |
| 3 | | | | | |
| 4 | | | | | |
| 5 | P1 | P0 | | P1 | P0 |

Subcarrier index i=I(k)

FIG. 14

OFDM symbol index j

| | 0 | 1 | 2 | 3 | 4 | 5 | 6 |
|---|---|---|---|---|---|---|---|
| 0 | P0 | P1 | | | | P0 | P1 |
| 1 | | | | | | | |
| 2 | | | | | | | |
| 3 | | | | | | | |
| 4 | | | | | | | |
| 5 | P1 | P0 | | | | P1 | P0 |

Subcarrier index i=I(k)

FIG. 15

OFDM symbol index j

| | 0 | 1 | 2 | 3 | 4 | 5 | 6 |
|---|---|---|---|---|---|---|---|
| 0 | P0 | P1 | | | P0 | P1 | |
| 1 | | | | | | | |
| 2 | | | | | | | |
| 3 | | | | | | | |
| 4 | | | | | | | |
| 5 | P1 | P0 | | | P1 | P0 | |

Subcarrier index i=I(k)

FIG. 16

OFDM symbol index j

| | 0 | 1 | 2 | 3 | 4 | 5 | 6 |
|---|---|---|---|---|---|---|---|
| 0 | | P0 | P1 | | | P0 | P1 |
| 1 | | | | | | | |
| 2 | | | | | | | |
| 3 | | | | | | | |
| 4 | | | | | | | |
| 5 | | P1 | P0 | | | P1 | P0 |

Subcarrier index i=I(k)

FIG. 17

OFDM symbol index j →

| Subcarrier index i=I(k) | 0 | 1 | 2 | 3 | 4 |
|---|---|---|---|---|---|
| 0 | P0 | | | P0 | |
| 1 | P1 | | | P1 | |
| 2 | | | P0 | | P0 |
| 3 | | | P1 | | P1 |

FIG. 18

OFDM symbol index j →

| Subcarrier index i=I(k) | 0 | 1 | 2 | 3 | 4 |
|---|---|---|---|---|---|
| 0 | P0 | | | P1 | |
| 1 | P1 | | | P0 | |
| 2 | | | P0 | | P1 |
| 3 | | | P1 | | P0 |

FIG. 19

OFDM symbol index j →

| Subcarrier index i=I(k) | 0 | 1 | 2 | 3 | 4 | 5 | 6 |
|---|---|---|---|---|---|---|---|
| 0 | P0 | | | | | P0 | |
| 1 | P1 | | | | | P1 | |
| 2 | | | P0 | | | | P0 |
| 3 | | | P1 | | | | P1 |

FIG. 20

OFDM symbol index j →

| Subcarrier index i=I(k) | 0 | 1 | 2 | 3 | 4 | 5 | 6 |
|---|---|---|---|---|---|---|---|
| 0 | P0 | | | | | P1 | |
| 1 | P1 | | | | | P0 | |
| 2 | | | P0 | | | | P1 |
| 3 | | | P1 | | | | P0 |

FIG. 21

Subcarrier index i=I(k) →
OFDM symbol index j →

| | 0 | 1 | 2 | 3 | 4 | 5 | 6 |
|---|---|---|---|---|---|---|---|
| 0 | P0 | | | | P0 | | |
| 1 | P1 | | | | P1 | | |
| 2 | | | P0 | | | P0 | |
| 3 | | | P1 | | | P1 | |

FIG. 22

Subcarrier index i=I(k) →
OFDM symbol index j →

| | 0 | 1 | 2 | 3 | 4 | 5 | 6 |
|---|---|---|---|---|---|---|---|
| 0 | P0 | | | | P1 | | |
| 1 | P1 | | | | P0 | | |
| 2 | | | P0 | | | P1 | |
| 3 | | | P1 | | | P0 | |

FIG. 23

Subcarrier index i=I(k) →
OFDM symbol index j →

| | 0 | 1 | 2 | 3 | 4 | 5 | 6 |
|---|---|---|---|---|---|---|---|
| 0 | | P0 | | | | P0 | |
| 1 | | P1 | | | | P1 | |
| 2 | | | | P0 | | | P0 |
| 3 | | | | P1 | | | P1 |

FIG. 24

Subcarrier index i=I(k) →
OFDM symbol index j →

| | 0 | 1 | 2 | 3 | 4 | 5 | 6 |
|---|---|---|---|---|---|---|---|
| 0 | | P0 | | | | P1 | |
| 1 | | P1 | | | | P0 | |
| 2 | | | | P0 | | | P1 |
| 3 | | | | P1 | | | P0 |

FIG. 25

OFDM symbol index j →

Subcarrier index i=I(k) ↓

| | 0 | 1 | 2 | 3 | 4 |
|---|---|---|---|---|---|
| 0 | P0 | P2 | | P1 | P3 |
| 1 | | | | | |
| 2 | | | | | |
| 3 | | | | | |
| 4 | | | | | |
| 5 | P1 | P3 | | P0 | P2 |
| 6 | | | | | |
| 7 | | | | | |
| 8 | | | | | |
| 9 | | | | | |
| 10 | | | | | |
| 11 | | | | | |
| 12 | P2 | P0 | | P3 | P1 |
| 13 | | | | | |
| 14 | | | | | |
| 15 | | | | | |
| 16 | | | | | |
| 17 | P3 | P1 | | P2 | P0 |

FIG. 26

OFDM symbol index j →

| | 0 | 1 | 2 | 3 | 4 | 5 | 6 |
|---|---|---|---|---|---|---|---|
| 0 | P0 | P2 | | | | P1 | P3 |
| 1 | | | | | | | |
| 2 | | | | | | | |
| 3 | | | | | | | |
| 4 | | | | | | | |
| 5 | P1 | P3 | | | | P0 | P2 |
| 6 | | | | | | | |
| 7 | | | | | | | |
| 8 | | | | | | | |
| 9 | | | | | | | |
| 10 | | | | | | | |
| 11 | | | | | | | |
| 12 | P2 | P0 | | | | P3 | P1 |
| 13 | | | | | | | |
| 14 | | | | | | | |
| 15 | | | | | | | |
| 16 | | | | | | | |
| 17 | P3 | P1 | | | | P2 | P0 |

Subcarrier index i=I(k) ↓

FIG. 27

OFDM symbol index j →

| | 0 | 1 | 2 | 3 | 4 | 5 | 6 |
|---|---|---|---|---|---|---|---|
| 0 | P0 | P2 | | | P1 | P3 | |
| 1 | | | | | | | |
| 2 | | | | | | | |
| 3 | | | | | | | |
| 4 | | | | | | | |
| 5 | P1 | P3 | | | P0 | P2 | |
| 6 | | | | | | | |
| 7 | | | | | | | |
| 8 | | | | | | | |
| 9 | | | | | | | |
| 10 | | | | | | | |
| 11 | | | | | | | |
| 12 | P2 | P0 | | | P3 | P1 | |
| 13 | | | | | | | |
| 14 | | | | | | | |
| 15 | | | | | | | |
| 16 | | | | | | | |
| 17 | P3 | P1 | | | P2 | P0 | |

Subcarrier index i=I(k) ↓

FIG. 28

OFDM symbol index j →

|   | 0 | 1 | 2 | 3 | 4 | 5 | 6 |
|---|---|---|---|---|---|---|---|
| 0 |  | P0 | P2 |  |  | P1 | P3 |
| 1 |  |  |  |  |  |  |  |
| 2 |  |  |  |  |  |  |  |
| 3 |  |  |  |  |  |  |  |
| 4 |  |  |  |  |  |  |  |
| 5 |  | P1 | P3 |  |  | P0 | P2 |
| 6 |  |  |  |  |  |  |  |
| 7 |  |  |  |  |  |  |  |
| 8 |  |  |  |  |  |  |  |
| 9 |  |  |  |  |  |  |  |
| 10 |  |  |  |  |  |  |  |
| 11 |  |  |  |  |  |  |  |
| 12 |  | P2 | P0 |  |  | P3 | P1 |
| 13 |  |  |  |  |  |  |  |
| 14 |  |  |  |  |  |  |  |
| 15 |  |  |  |  |  |  |  |
| 16 |  |  |  |  |  |  |  |
| 17 |  | P3 | P1 |  |  | P2 | P0 |

Subcarrier index i=I(k) ↓

WIRELESS COMMUNICATION SYSTEM WITH MULTIPLE TRANSMISSION ANTENNAS USING PILOT SUBCARRIER ALLOCATION

CROSS-REFERENCE TO RELATED APPLICATIONS

Pursuant to 35 U.S.C. §119(a), this application claims the benefit of earlier filing date and right of priority to Korean Application No. 10-2009-0009390, filed on Feb. 5, 2009, U.S. Provisional Application No. 61/082,820, filed on Jul. 22, 2008, US Provisional Application No. 61/099,211, filed on Sep. 23, 2008, and U.S. Provisional Application No. 61/089,565, filed on Aug. 18, 2008 respectively, the contents of which are hereby incorporated by reference herein in their entirety.

BACKGROUND OF THE INVENTION

1. Field of the Invention

The present invention relates to a wireless communication system. In particular, the present invention relates to a method of allocating pilot subcarriers in the wireless communication system including a multiple-input multiple-output (MIMO) antenna system.

2. Description of the Background Art

The Institute of Electrical and Electronics Engineers (IEEE) 802.16 standard provides a technology of supporting a broadband wireless access and a protocol. The standardization has been progressed since 1999 and IEEE 802.16-2001 was approved in 2001. This has been established based on a single carrier physical layer called "WirelessMAN-SC". In the IEEE 802.16a which was approved in 2003, "WirelessMAN-OFDM" and "WirelessMAN-OFDMA" were added to a physical layer in addition to "WirelessMAN-SC". After the IEEE 802.16a standard was completed, a revised IEEE 802.16-2004 was approved in 2004. In order to correct bugs and errors of the IEEE 802.16-2004, IEEE 802.16-2004/Corl was completed in the form of "corrigendum" in 2005.

A MIMO antenna technology improves data transmission/reception efficiency using multiple transmission antennas and multiple reception antennas. The MIMO technology was introduced in the IEEE 802.16a standard and has been continuously updated.

The MIMO technology is divided into a spatial multiplexing method and a spatial diversity method. In the spatial multiplexing method, since different data is simultaneously transmitted, data can be transmitted at a high speed without increasing the bandwidth of a system. In the spatial diversity method, since the same data is transmitted via multiple transmission antennas so as to obtain diversity gain, reliability of the data is increased.

A receiver needs to estimate a channel in order to restore data transmitted from a transmitter. Channel estimation indicates a process of compensating for distortion of a signal, which occurs by a rapid environment variation due to fading and restoring the transmission signal. In general, for channel estimation, the transmitter and the receiver need to know pilots.

In the MIMO system, a signal experiences a channel corresponding to each antenna. Accordingly, it is necessary to arrange the pilots in consideration of multiple antennas. While the number of pilots is increased as the number of antennas is increased, it is impossible to increase the number of antennas so as to increase a data transfer rate.

In the prior art, different pilot allocation structures have been designed and used according to permutation (dispersion/AMC/PUSC/FUSC) methods. This is because the permutation methods are separated from each other along with time axis in the IEEE 802.16e system and thus structures could be differently optimized according to permutation methods. However, if the permutation methods coexist in certain time instance, a unified basic data allocation structure is necessary.

In the prior art, since severe pilot overhead occurs, a transfer rate is decreased. In addition, since the same pilot structure is applied to adjacent cells or sectors, collision between the cells or the sectors may occur. Accordingly, there is a need for a method of efficiently allocating pilot subcarriers in the MIMO system.

SUMMARY OF THE INVENTION

An object of the present invention is to provide a method of efficiently allocating pilot subcarriers in wireless communication system including a MIMO system irrespective of uplink/downlink and specific permutation schemes. Specifically, the present invention is for improving channel estimation performance in a communication system supporting a subframe comprised of 5 OFDMA symbols or 7 OFDMA symbols. The present invention is applicable to new wireless communication systems such as IEEE 802.16m.

The object of the present invention can be achieved by a number of aspects of the present invention described below.

In an aspect of the present invention, a method of allocating pilot subcarriers in a resource block for a wideband wireless mobile communication system with multiple transmission antennas using orthogonal frequency division multiple access (OFDMA) modulation, comprises allocating pilot subcarriers to the resource block so that only four (4) OFDMA symbols of the resource block are allocated for pilot subcarriers, wherein the resource block has seven (7) OFDMA symbols. Preferably, a set of the OFDMA symbol index numbers of the four (4) OFDMA symbols is one of (0, 1, 5, 6), (0, 1, 4, 5), and (1, 2, 5, 6), wherein a set of index numbers (o, p, q, r) indicates $(o+1)^{th}$ OFDMA symbol, $(p+1)^{th}$ OFDMA symbol, $(q+1)^{th}$ OFDMA symbol, and $(r+1)^{th}$ OFDMA symbol in the resource block. Preferably, the multiple transmission antennas consist of four (4) transmission antennas, the resource block consists of 18 subcarriers, and each of the OFDMA symbols allocated for pilot subcarriers includes a pilot subcarrier for a first transmission antenna, a pilot subcarrier for a second transmission antenna, a pilot subcarrier for a third transmission antenna, and a pilot subcarrier for a fourth transmission antenna of the four (4) transmission antennas. Preferably, the multiple transmission antennas consist of four (4) transmission antennas, the resource block consists of 18 subcarriers, and each of the OFDMA symbols allocated for pilot subcarriers includes a pilot subcarrier for a first transmission antenna, a pilot subcarrier for a second transmission antenna, a pilot subcarrier for a third transmission antenna, and a pilot subcarrier for a fourth transmission antenna of the four (4) transmission antennas. Preferably, the multiple transmission antennas consist of two (2) transmission antennas, and each of the OFDMA symbols allocated for pilot subcarriers includes a pilot subcarrier for a first transmission antenna and a pilot subcarrier for a second transmission antenna of the two (2) transmission antennas. Preferably, the resource block consists of 4 subcarriers or 6 subcarriers.

In another aspect of the present invention, a method of allocating pilot subcarriers in a resource block for a wideband wireless mobile communication system with multiple transmission antennas using orthogonal frequency division multiplexing (OFDMA) modulation, the method comprising: allocating pilot subcarriers to the resource block so that only four (4) OFDMA symbols of the resource block are allocated for pilot subcarriers, wherein the resource block has five (5) OFDMA symbols.

Preferably, the OFDMA symbol index numbers of the four (4) OFDMA symbols is 0, 1, 3, and 4, wherein a index number p indicates $(p+1)^{th}$ OFDMA symbol in the resource block. Preferably, the resource block consists of 18 subcarriers, the multiple transmission antennas consist of four (4) transmission antennas, and each of the OFDMA symbols allocated for pilot subcarriers includes a pilot subcarrier for a first transmission antenna, a pilot subcarrier for a second transmission antenna, a pilot subcarrier for a third transmission antenna, and a pilot subcarrier for a fourth transmission antenna of the four (4) transmission antennas. Preferably, the multiple transmission antennas consist of two (2) transmission antennas, and each of the OFDMA symbols allocated for pilot subcarriers includes a pilot subcarrier for a first transmission antenna and a pilot subcarrier for a second transmission antenna of the two (2) transmission antennas. Preferably, the resource block may consist of 4 subcarriers or 6 subcarriers.

In still another aspect of the present invention, A wireless communication system having multiple transmission antennas using orthogonal frequency division multiple access (OFDMA) modulation, the wireless communication system comprising: a multiple-input multiple-output (MIMO) antenna; an OFDMA modulator operably connected to the MIMO antenna; and a processor operably connected to the OFDMA modulator, wherein the processor is configured to allocate pilot subcarriers to a resource block so that only four (4) OFDMA symbols of the resource block are allocated for pilot subcarriers, wherein, the resource block has seven (7) OFDMA symbols, a set of the OFDMA symbol index numbers of the four (4) OFDMA symbols is one of (0, 1, 5, 6), (0, 1, 4, 5), and (1, 2, 5, 6), wherein a set of index numbers (o, p, q, r) indicates $(o+1)^{th}$ OFDMA symbol, $(p+1)^{th}$ OFDMA symbol, $(q+1)^{th}$ OFDMA symbol, and $(r+1)^{th}$ OFDMA symbol in the resource block.

In still another aspect of the present invention, a wireless communication system having multiple transmission antennas using orthogonal frequency division multiple access (OFDMA) modulation, the wireless communication system comprising: a multiple-input multiple-output (MIMO) antenna; an OFDMA modulator operably connected to the MIMO antenna; and a processor operably connected to the OFDMA modulator, wherein the processor is configured to allocate pilot subcarriers to a resource block so that only four (4) OFDMA symbols of the resource block are allocated for pilot subcarriers, wherein, the resource block has five (5) OFDMA symbols, the OFDMA symbol index numbers of the four (4) OFDMA symbols is 0, 1, 3, and 4, wherein a index number p indicates $(p+1)^{th}$ OFDMA symbol in the resource block

BRIEF DESCRIPTION OF THE DRAWINGS

The accompanying drawings, which are included to provide a further understanding of the invention, illustrate embodiments of the invention and together with the description serve to explain the principle of the invention.

FIG. 8 to FIG. 11 show exemplary conventional structures used for allocating pilots for a communication system with 2 transmission antennas for a normal subframe comprised of 6 OFDMA symbols.

FIG. 12 shows an exemplary conventional structure used for allocating pilots for a communication system with 4 transmission antennas for a normal subframe comprised of 18 subcarriers and 6 OFDMA symbols.

FIG. 13 shows a pilot allocation structure for a tile comprised of 5 OFDMA symbols according to one embodiment of the invention.

FIG. 14 shows a pilot allocation structure for a tile comprised of 7 OFDMA symbols according to one embodiment of the invention.

FIG. 15 and FIG. 16 show pilot allocation structures for a tile comprised of 7 OFDMA symbols according to one embodiment of the invention.

FIG. 17 and FIG. 18 show pilot allocation structures for a subframe comprised of 5 OFDMA symbols according to one embodiment of the invention.

FIG. 19 and FIG. 20 show pilot allocation structures for a subframe comprised of 7 OFDMA symbols according to one embodiment of the invention.

FIG. 21 to FIG. 24 show pilot allocation structures for a subframe comprised of 7 OFDMA symbols according to one embodiment of the invention.

FIG. 25 shows a pilot allocation structure for a subframe comprised of 5 OFDMA symbols according to one embodiment of the invention.

FIG. 26 shows a pilot allocation structure for a subframe comprised of 7 OFDMA symbols according to one embodiment of the invention.

FIG. 27 and FIG. 28 show pilot allocation structures for a subframe comprised of 7 OFDMA symbols according to one embodiment of the invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The following technology may be used in various wireless communication systems. A wireless communication system is widely provided in order to provide various communication services such as voice and packet data. This technology may be used in downlink or uplink. In general, the downlink indicates communication from a base station (BS) to a user equipment (UE) and the uplink indicates communication from the UE to the BS. The BS generally indicates a fixed station communicating with the UE and may also be called a node-B, a base transceiver system (BTS) or an access point. The UE may be fixed or moved and may also be called as a mobile station (MS), a user terminal (UT), a subscriber station (SS) or a wireless device.

Hereinafter, an efficient pilot structure for a new system will be described. The new system will be described concentrating on an IEEE 802.16m system, but the same principle may apply to other systems.

A communication system may be a multiple-input multiple-output (MIMO) system or a multiple-input single-output (MISO) system. The MIMO system uses a plurality of transmission antennas and a plurality of reception antennas. The MISO system uses a plurality of transmission antennas and one reception antenna.

Figure 1:
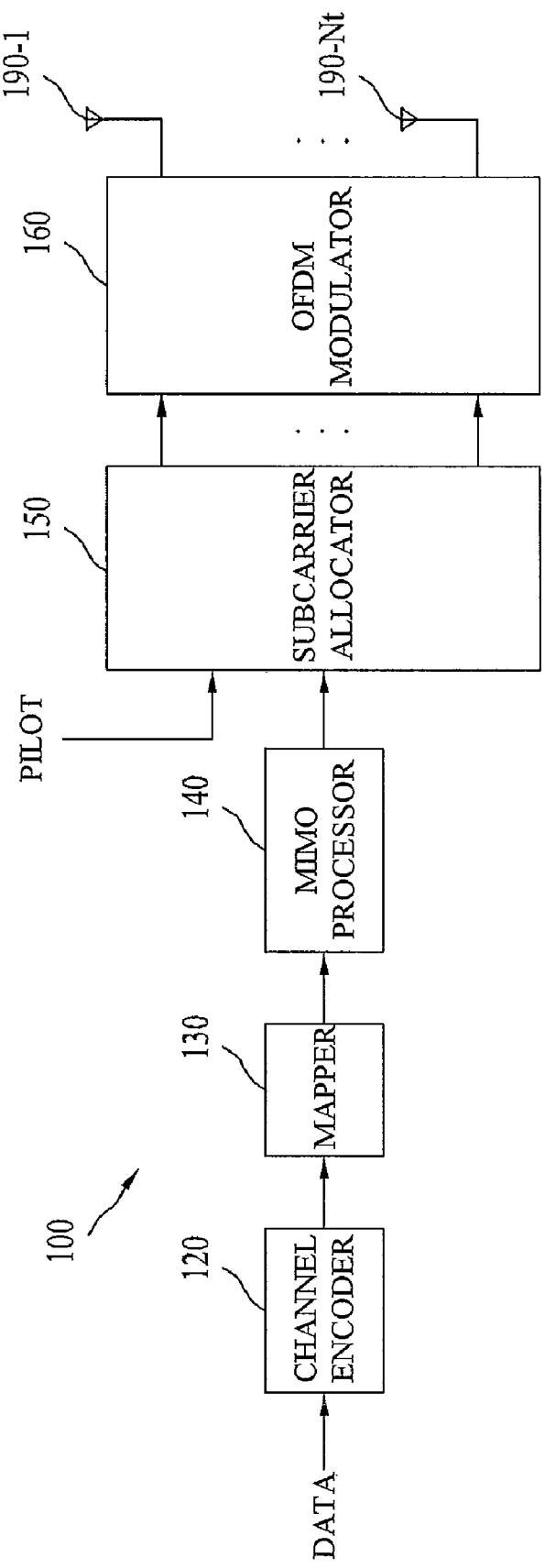
FIG. 1 is a block diagram of a transmitter having multiple antennas.

FIG. 1 is a block diagram of a transmitter having multiple antennas. Referring to FIG. 1, the transmitter 100 includes a channel encoder 120, a mapper 130, an MIMO processor 140, a subcarrier allocator 150 and an orthogonal frequency division multiple access (OFDMA) modulator 160. The channel encoder 120, mapper 130, MIMO processor 140, and subcarrier allocator 150 may be embodied as separate components or combined in a single processor of the transmitter 100.

The channel encoder 120 encodes an input stream according to a predefined coding method and builds a coded word. The mapper 130 maps the coded word to a symbol representing a position on signal constellation. A modulation scheme of the mapper 130 is not restricted and may include an m-phase shift keying (m-PSK) scheme or an m-quadrature amplitude modulation (m-QAM) scheme.

The MIMO processor 140 processes the input symbol by a MIMO method using a plurality of transmission antennas 190-1, . . . , and 190-Nt. For example, the MIMO processor 140 can perform preceding based on codebook.

The subcarrier allocator 150 allocates the input symbol and pilots to subcarriers. The pilots are arranged according to the transmission antennas 190-1, ..., and 190-Nt. The pilots are known by both the transmitter 100 and a receiver (200 of FIG. 2), which are used for the channel estimation or the data demodulation, and are also called as reference signals.

The OFDMA modulator 160 modulates the input symbol and outputs OFDMA symbols. The OFDMA modulator 160 may perform an inverse fast Fourier transform (IFFT) with respect to the input symbol and further insert a cyclic prefix (CP) after performing the IFFT. The OFDMA symbols are transmitted via the transmission antennas 190-1, ..., and 190-Nt.

Figure 2:
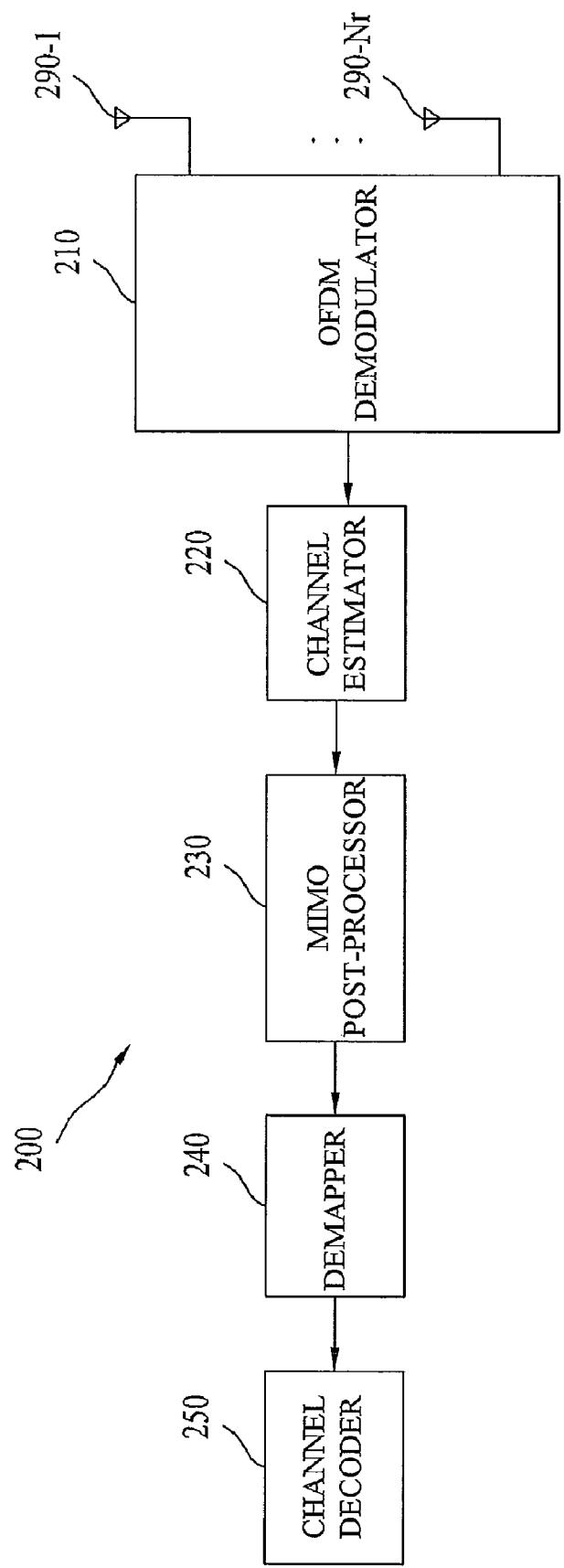
FIG. 2 is a block diagram of a receiver having multiple antennas.

FIG. 2 is a block diagram of a receiver having multiple antennas. Referring to FIG. 2, the receiver 200 includes an OFDMA demodulator 210, a channel estimator 220, an MIMO post-processor 230, a demapper 240 and a channel decoder 250. The channel estimator 220, MIMO post-processor 230, demapper 240 and channel decoder 250 may be embodied as separate components or combined in a single processor of the receiver 200.

Signals received via reception antennas 290-1, . . . , and 290-Nr are Fast Fourier transformed (FFT) by the OFDMA demodulator 210. The channel estimator 220 estimates channels using pilots. The MIMO post-processor 230 performs a post-process corresponding to the MIMO processor 140. The demapper 240 demaps the input symbol to the coded word. The channel decoder 250 decodes the coded word and restores original data.

Figure 3:
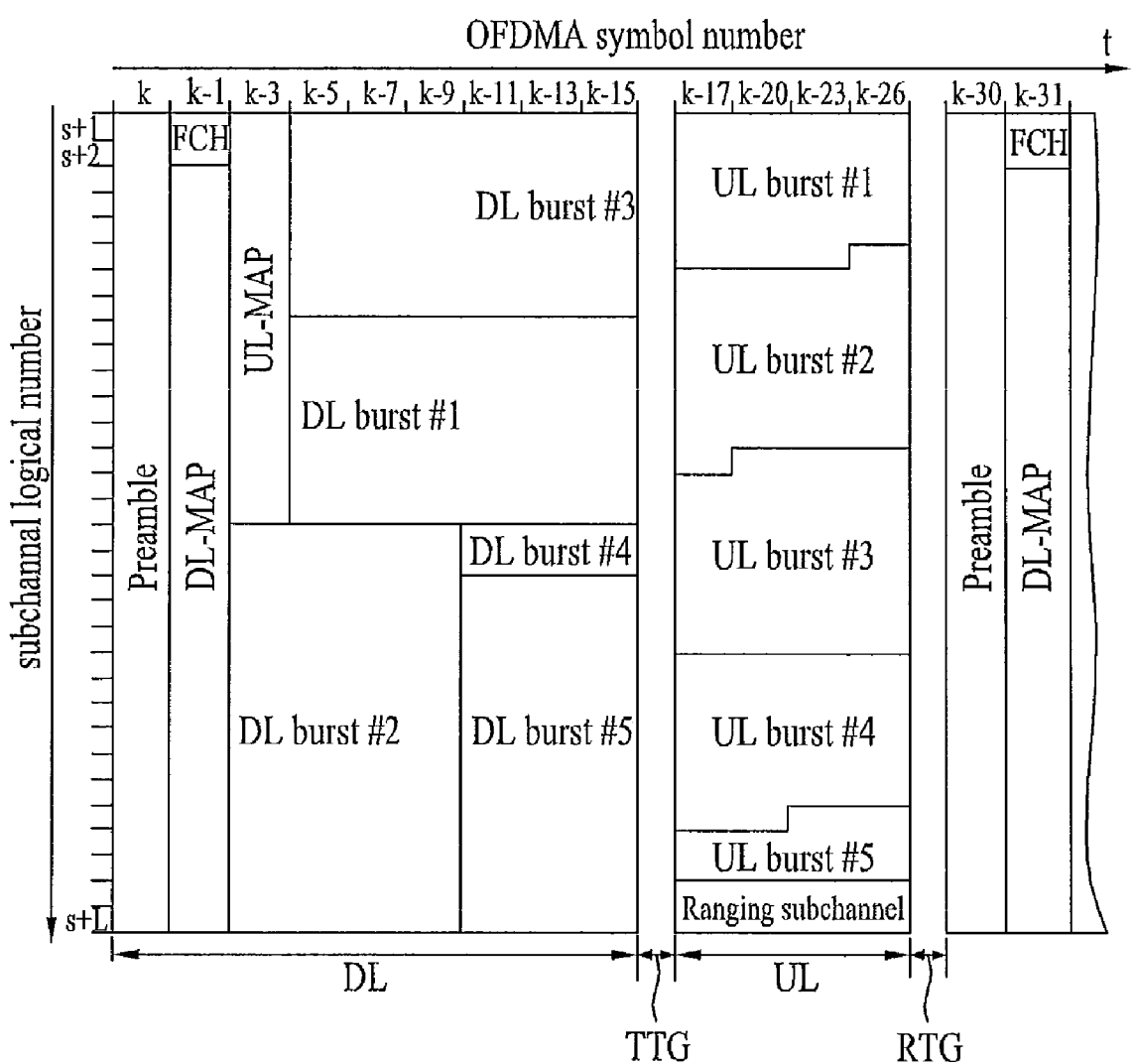
FIG. 3 shows a frame structure.

FIG. 3 is an example of a frame structure. A frame is a data sequence during a fixed time period used by a physical specification, which refers to section 8.4.4.2 of IEEE standard 802.16-2004 "Part 16: Air Interface for Fixed Broadband Wireless Access Systems" (hereinafter, referred to as reference Document 1, the entire contents of which being incorporated herein by reference).

Referring to FIG. 3, the frame includes a downlink (DL) frame and an uplink (UL) frame. Time division duplex (TDD) is a scheme in which the uplink and downlink transmission are separated in time domain but share the same frequency. Normally, the DL frame precedes the UL frame. The DL frame starts in the order of Preamble, Frame Control Header (FCH), Downlink (DL)-MAP, Uplink (UL)-MAP and burst regions (DL burst #1~5 and UL burst #1~5). A guard time for separating the DL frame and the UL frame from each other is inserted at both an intermediate portion of the frame (between the DL frame and the UL frame) and a last portion of the frame (following the UL frame). A transmit/receive transition gap (TTG) is a gap defined between a downlink burst and a subsequent uplink burst. A receive/transmit transition gap (RTG) is a gap defined between an uplink burst and a subsequent downlink burst.

The preamble is used for initial synchronization between the BS and the UE, cell search, frequency offset estimation and channel estimation. The FCH includes information regarding the length of the DL-MAP message and the coding scheme of the DL-MAP. The DL-MAP is a region where the DL-MAP message is transmitted. The DL-MAP message defines the access of a downlink channel. The DL-MAP message includes a configuration change count of a Downlink Channel Descriptor (DCD) and a BS identifier (ID). The DCD describes a downlink burst profile applied to a current frame. The downlink burst profile refers to the property of a downlink physical channel, and the DCD is periodically transmitted by the BS through the DCD message.

The UL-MAP is a region where the UL-MAP message is transmitted. The UL-MAP message defines the access of an uplink channel. The UL-MAP message includes a configuration change count of an Uplink Channel Descriptor (UCD), and an effective start time of the uplink allocation defined by the UL-MAP. The UCD describes an uplink burst profile. The uplink burst profile refers to the property of an uplink physical channel, and the UCD is periodically transmitted by the BS through the UCD message.

Hereinafter, a slot is a minimum data allocation unit and is defined by a time and a subchannel. The number of subchannels depends on a FFT size and time-frequency mapping. The subchannel includes a plurality of subcarriers and the number of subcarriers per subchannel varies according to a permutation method. The permutation indicates mapping of a logical subchannel to a physical subcarrier. The subchannel includes 48 subcarriers in full usage of subchannels (FUSC) and the subchannel includes 24 or 16 subcarriers in partial usage of subchannels (PUSC) A segment indicates at least one subchannel set.

In order to map data to physical subcarriers in a physical layer, two steps are generally performed. In a first step, data is mapped to at least one data slot on at least one logical subchannel. In a second step, the logical subchannel is mapped to the physical subchannel. This is called permutation. Reference document 1 discloses a permutation method such as FUSC, PUSC, Optimal-FUSC (O-FUSC), Optional-PUSC (O-PUSC) and Adaptive modulation and coding (AMC). A set of OFDMA symbols using the same permutation method is called a permutation zone and one frame includes at least one permutation zone.

The FUSC and the O-FUSC are used only for the downlink transmission. The FUSC is composed of one segment including all subchannel groups. The subchannels are mapped to the physical subcarriers distributed via all physical channels. The mapping is changed according to OFDMA symbols. The slot is composed of one subchannel on one OFDMA symbol. The methods of allocating pilots in the O-FUSC and FUSC are different from each other.

The PUSC is used for both the downlink transmission and the uplink transmission. In the downlink, each physical channel is divided into clusters including 14 contiguous subcarriers on two OFDMA symbols. The physical channel is mapped in the unit of six groups. In each group, the pilots are allocated to the clusters at fixed positions. In the uplink, the subcarriers are divided into tiles composed of four contiguous physical subcarriers on three OFDMA symbols. The subchannel includes six tiles. The pilots are allocated to corners of the tiles. The O-PUSC is used only for the uplink transmission and the tile is composed of three contiguous physical subcarriers on three OFDMA symbols. The pilots are allocated to the centers of the tiles.

Figure 4:
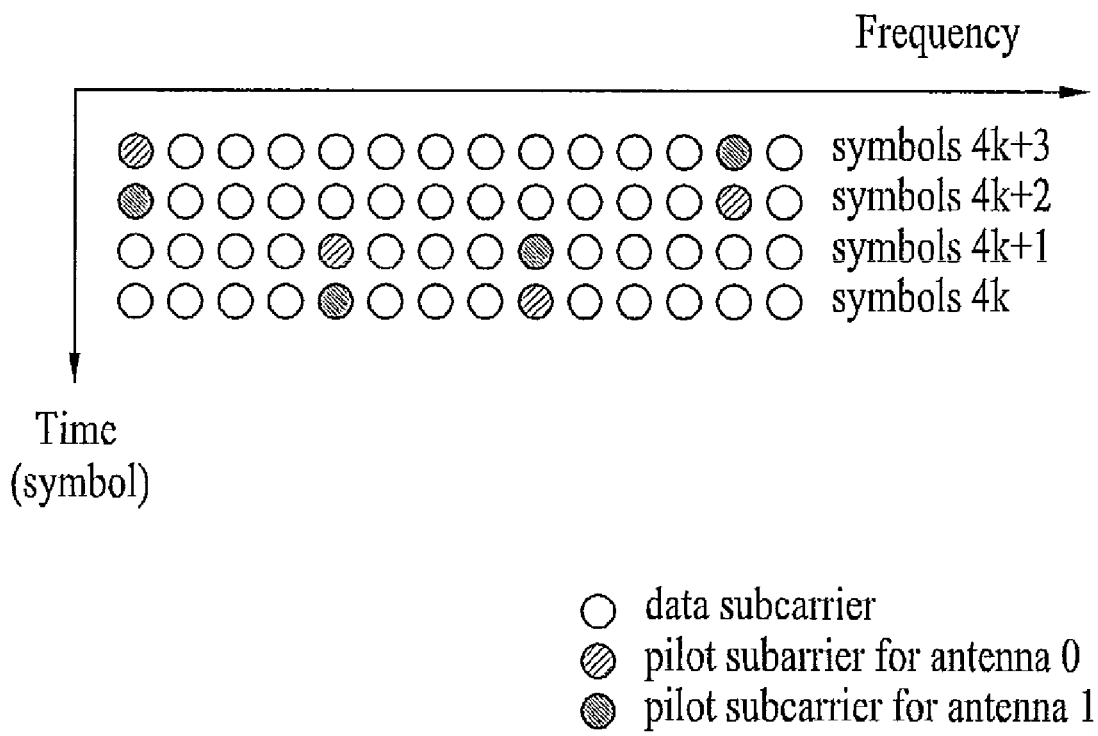
FIG. 4 shows a conventional pilot arrangement of two transmission antennas in partial usage of subchannels (PUSC).
Figure 5:
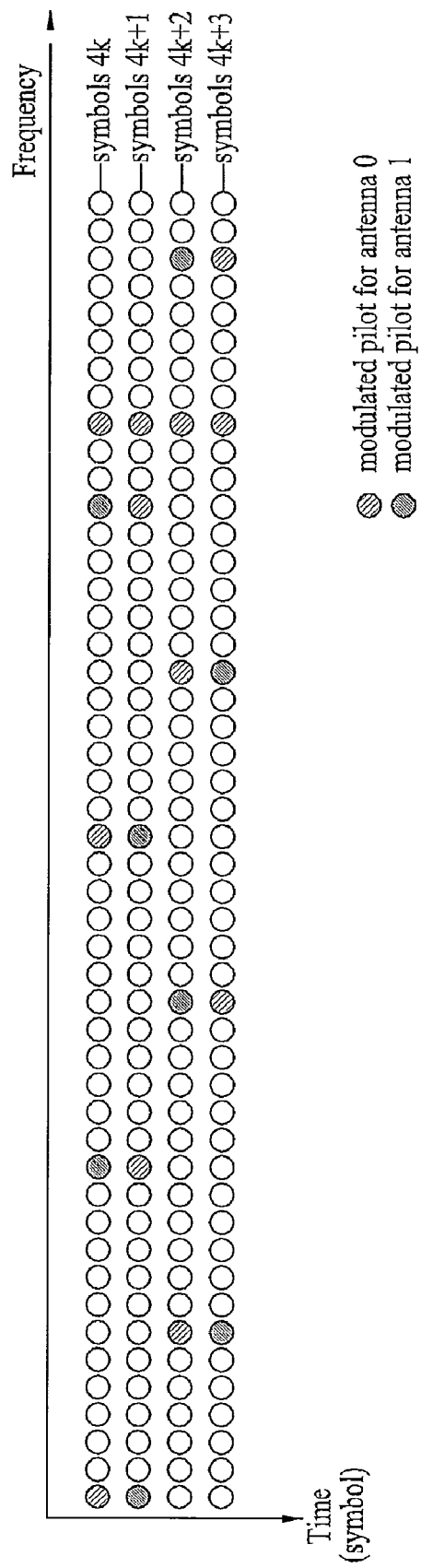
FIG. 5 shows a conventional pilot arrangement of two transmission antennas in full usage of subchannels (FUSC).
Figure 6:
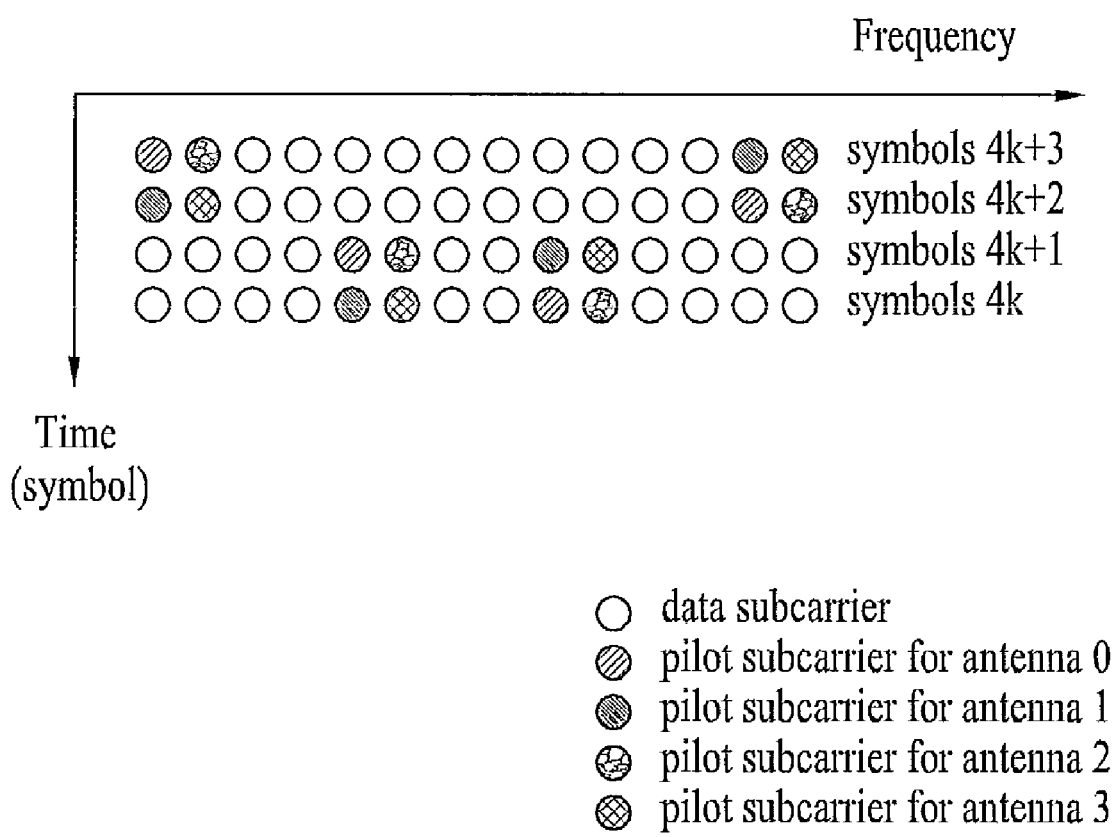
FIG. 6 shows a conventional pilot arrangement of four transmission antennas in the PUSC.
Figure 7:
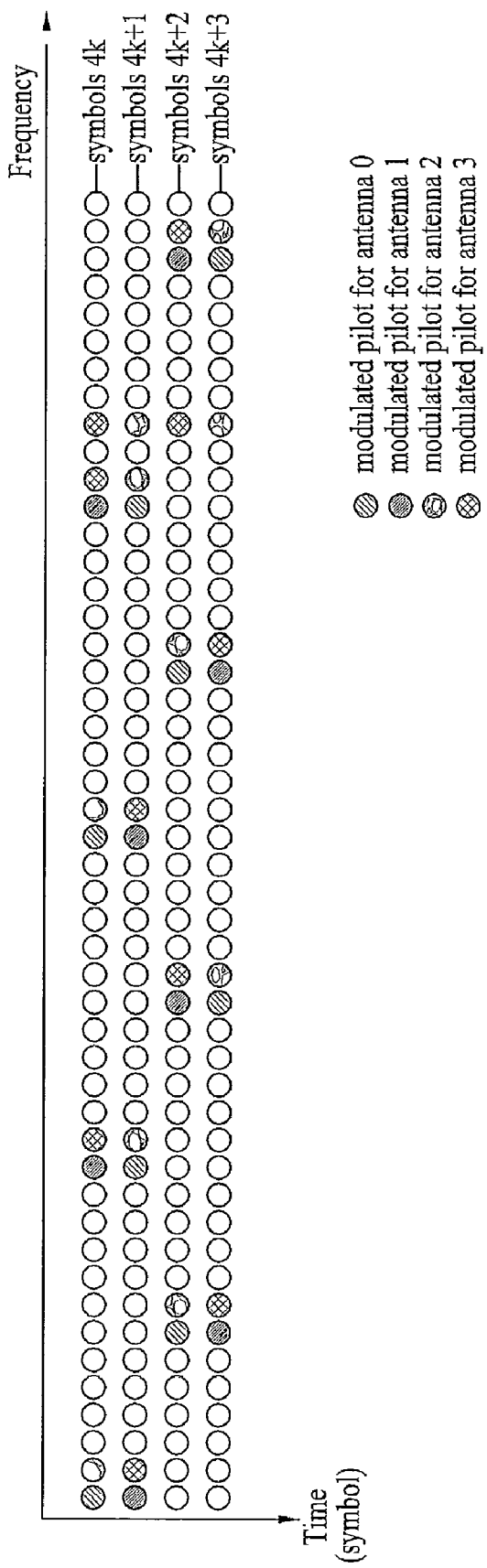
FIG. 7 shows a conventional pilot arrangement of four transmission antennas in FUSC.

FIGS. 4 and 5 show a conventional pilot arrangement of two transmission antennas in the PUSC and FUSC, respectively. FIGS. 6 and 7 show a conventional pilot arrangement of four transmission antennas in the PUSC and FUSC, respectively. They refer to section 8.4.8.1.2.1.1, section 8.4.8.1.2.1.2, section 8.4.8.2.1, and section 8.4.8.2.2 of IEEE standard 802.16-2004/Cor1-2005 "Part 16: Air Interface for Fixed and Mobile Broadband Wireless Access Systems; Amendment 2: Physical and Medium Access Control Layers for Combined Fixed and Mobile Operation in Licensed Bands and Corrigendum 1" (hereinafter, referred to as Reference Document 2, the entire contents of which being incorporated herein by reference).

Referring to FIGS. 4 to 7, pilot overhead is large when the allocation of the subcarrier is performed according to the PUSC or the FUSC. In particular, the overhead is larger when one transmission antenna is used compared to when at least two transmission antennas is used, in consideration of pilot overhead per transmission antenna.

Table 1 shows the pilot overhead according to the number of transmission antennas in each permutation method.

TABLE 1

| Number of transmission antennas | PUSC | FUSC | O-FUSC |
| --- | --- | --- | --- |
| 1 | 14.28% (14.28%) | 9.75% (9.75%) | 11.1% (11.1%) |
| 2 | 14.28% (7.14%) | 9.75% (4.78%) | 11.1% (5.55%) |
| 4 | 28.55% (7.14%) | 18.09% (4.52%) | 22.21% (5.55%) |

The pilot overhead is a value obtained by dividing the number of subcarriers allocated to the pilots by the number of all subcarriers which are used. The value in parenthesis indicates the pilot overhead per transmission antenna. Further, according to Reference Document 2, if four or three transmission antennas are used, mapping of the data to the subchannels is performed after puncturing or truncation with respect to channel encoded data.

In a conventional pilot allocation method, pilots are allocated for a normal subframe comprised of 6 OFDMA symbols, known as a regular subframe. In the conventional art, there are also irregular subframes comprised of 5 or 7 OFDMA symbols but without any pilots allocated therein.

FIG. 8 to FIG. 11 illustrate exemplary conventional structures used to allocate pilots for a communication system with 2 transmission antennas for a normal subframe comprised of 6 OFDMA symbols. FIG. 12 illustrates an exemplary conventional structure used to allocate pilots for a communication system with 4 transmission antennas for a normal subframe comprised of 6 OFDMA symbols. Referring to FIG. 8 to FIG. 12, the horizontal axis (index symbol 'j') denotes a set of OFDMA symbols in the time domain and the vertical axis (index symbol 'i') denotes the subcarriers in the frequency domain. In addition, P0, P1, P2, and P3 denote the pilot subcarriers corresponding to the antennas 1, 2, 3, and 4, respectively.

FIG. 8 shows an exemplary conventional pilot allocation method for a unit resource block in a form of 18*6 size of matrix structure representing 18 subcarriers and 6 OFDMA symbols.

FIG. 9 shows an exemplary conventional pilot allocation method for a tile in a form of 6*6 size of matrix structure representing 6 subcarriers and 6 OFDMA symbols.

FIG. 10 and FIG. 11 show a first and a second conventional exemplary pilot allocation method for a tile in a form of 4*6 size of matrix structure representing 4 subcarriers and 6 OFDMA symbols, respectively.

FIG. 12 shows an exemplary conventional pilot allocation method for a unit resource block in a form of 18*6 size of matrix structure representing 18 subcarriers and 6 OFDMA symbols.

Conventional pilot allocation methods support only a normal subframe comprised of 6 OFDMA symbols. However, a new version of IEEE 802.16m defines a subframe comprised of 5 OFDMA symbols (hereinafter also referred to as an "irregular subframe" of a "reduced subframe") or a subframe comprised of 7 OFDMA symbols (hereinafter also referred to as an "irregular subframe" or an "extended subframe"). Accordingly, there exists a need to provide new pilot allocation methods for optimizing a channel estimation performance in the new communication systems.

Hereinafter, efficient pilot allocation structures according to embodiments of the present invention are described for a subframe with 5 OFDMA symbols or 7 OFDMA symbols other than a normal subframe with 6 OFDMA symbols. In the following embodiments, the horizontal axis (index symbol 'j') denotes a series of OFDMA symbols in the time domain and the vertical axis (index symbol 'i') denotes subcarriers in the frequency domain. P0, P1, P2, and P3 denote the pilot subcarriers corresponding to antenna 1, antenna 2, antenna 3, and antenna 4, respectively. The positions of the pilots for the antennas may be exchanged to each other without departing from the principal of this embodiment. Further, the present invention can be applied to a MBS system (multicast broadcast system) as well as a unicast service system.

Embodiments for 2 Tx System

Following embodiment 1 to embodiment 6 are for 2 Tx system.

For a communication system with 2 transmission antennas, the pilot allocation methods for the above mentioned extended/reduced subframes according to the present invention are schemes slightly modified from the pilot allocation methods for the normal subframe as shown above. If a communication system supports a large number of channel estimation methods and modules at the same time, overheads increase unnecessarily. Therefore, the pilot allocation methods for the normal subframe need not be significantly modified to introduce a pilot allocation method for the extended/reduced subframes.

According to the present invention, when a subframe is comprised of a number of OFDMA symbols other than 6 OFDMA symbols, the pilot allocation method for the extended/reduced subframe is performed by using an extra "OFDMA symbol column" in a pilot allocation structure of a normal subframe or by using one less "OFDMA symbol column" in a pilot allocation structure of a normal subframe (hereinafter, the term an "OFDMA symbol column" indicates a set of subcarriers of a OFDMA symbol in a resource block for pilot allocation). That is, in a case for a subframe comprised of 7 OFDMA symbols (i.e., an extended subframe), the conventional pilot allocation of the normal subframe is applied to the extended subframe except that an "OFDMA symbol column" is inserted or added thereto. In other case for a subframe comprised of 5 OFDMA symbols (i.e., a reduced subframe), the conventional pilot allocation of the normal subframe is applied to the reduced subframe except that an "OFDMA symbol column" is removed therefrom. Hereinafter, the term 'column' is used for description in this application instead of the term an "OFDMA symbol column" for convenience and clarity.

To construct a subframe comprised of 7 OFDM symbols (i.e., an extended subframe), a pilot allocation method of an embodiment according to the present invention may comprise a step of copying a 'column' that is allocated for pilot subcarriers from a pilot allocation structure of a normal subframe, and a step of adding the copied 'column' before the first OFDMA symbol of the pilot allocation structure of the normal subframe or after the last OFDMA symbol of the pilot allocation structure of the normal subframe. Preferably, the first 'column' or the last 'column' is not selected for copy because, if the first or the last column is copied and added before the first OFDMA symbol or after the last OFDMA symbol, two pilot subcarriers are consecutively allocated along the time axis at the same subcarrier, within a subframe or between two adjacent subframes, resulting in deteriorating channel estimation performance. Therefore, preferably, the second OFDMA symbol or the fifth OFDMA symbol is selected for copy.

To construct a subframe comprised of 7 OFDMA symbols (i.e., an extended subframe), a pilot allocation method of an embodiment according to the present invention may comprise a step of copying a 'column' that is not allocated for pilot subcarriers from a pilot allocation structure of a normal subframe, and a step of adding the copied 'column' before the first OFDMA symbol of the pilot allocation structure of the normal subframe or after the last OFDMA symbol of the pilot allocation structure of the normal subframe.

In the meanwhile, it is apparent that simply adding a column that is not allocated for pilot subcarriers leads to the same structure as above.

To construct a subframe comprised of 7 OFDMA symbols (i.e, an extended subframe), a pilot allocation method of an embodiment according to the present invention may comprise a step of copying a 'column' that is not allocated for pilot subcarriers from a pilot allocation structure of a normal subframe, and a step of adding the copied 'column' to any place between the first OFDMA symbol and the last OFDMA symbol of the pilot allocation structure of the normal subframe.

In the meanwhile, it is apparent that simply adding a column that is not reserved for pilot subcarriers leads to the same structure as above.

A "base tile" of 6*6 matrix structure representing 6 subcarriers and 6 OFDMA symbols is defined for embodiment 1 to embodiment 3 for description. The tile depicted in FIG. 9 serves as a 6*6 size of base tile for embodiments 1 to embodiment 3. In these embodiments, an "OFDMA symbol column" (hereinafter referred to as a 'column') in the 6*6 size of base tile is copied and then added or inserted to the 6*6 size of base tile to construct a tile comprised of 7 OFDMA symbols (i.e., an extended tile); otherwise, a 'column' is removed from the 6*6 size of base tile to construct a tile comprised of 5 OFDMA symbols (i.e., a reduced tile).

Embodiment 1

FIG. 13 shows a pilot allocation structure for a tile comprised of 5 OFDMA symbols (i.e., a reduced tile).

To construct a tile comprised of 5 OFDMA symbols (i.e., a reduced tile), a pilot allocation method of an embodiment according to the present invention may comprise a step of removing a 'column' from the 6*6 sized base tile described above. In this case, the third or the fourth column is removed from the 6*6 size of base tile.

In the pilot allocation structure shown in FIG. 13, the location where pilots for each antenna is allocated is represented in detail as follows:

<Pilot Allocation Index for FIG. 13>

Antenna 1

$I(k)=6k$, for OFDMA symbols where s is 0
$I(k)=6k+5$, for OFDMA symbols where s is 1
$I(k)=6k$, for OFDMA symbols where s is 3
$I(k)=6k+5$, for OFDMA symbols where s is 4

Antenna 2

$I(k)=6k+5$, for OFDMA symbols where s is 0
$I(k)=6k$, for OFDMA symbols where s is 1
$I(k)=6k+5$, for OFDMA symbols where s is 3
$I(k)=6k$, for OFDMA symbols where s is 4
where, $I(k)$: subcarrier index ($k=0, 1, \ldots$),
s: [OFDMA symbol index j] mod 5
(OFDMA symbol index $j=0, 1, 2, \ldots$)

Embodiment 2

FIG. 14 shows a pilot allocation structure for a tile comprised of 7 OFDMA symbols (i.e., an extended tile).

To construct a tile comprised of 7 OFDMA symbols (i.e., an extended tile), a pilot allocation method of an embodiment according to the present invention may comprise a step of inserting a 'column' that is not allocated for a pilot subcarrier to any place between the second OFDMA symbol and the fifth OFDMA symbol of the 6*6 base tile.

In the pilot allocation structure shown in FIG. 14, the location where pilots for each antenna is allocated is represented in detail as follows:

<Pilot Allocation Index for FIG. 14>

Antenna 1

$I(k)=6k$, for OFDMA symbols where s is 0
$I(k)=6k+5$, for OFDMA symbols where s is 1
$I(k)=6k$, for OFDMA symbols where s is 5
$I(k)=6k+5$, for OFDMA symbols where s is 6

Antenna 2

$I(k)=6k+5$, for OFDMA symbols where s is 0
$I(k)=6k$, for OFDMA symbols where s is 1
$I(k)=6k+5$, for OFDMA symbols where s is 5
$I(k)=6k$, for OFDMA symbols where s is 6
where, $I(k)$: subcarrier index ($k=0, 1, \ldots$),
s: [OFDMA symbol index j] mod 7
(OFDMA symbol index $j=0, 1, 2, \ldots$)

Embodiment 3

FIG. 15 and FIG. 16 show pilot allocation structures for a tile comprised of 7 OFDMA symbols (i.e., an extended tile).

To construct a tile comprised of 7 OFDMA symbols (i.e., an extended tile), a pilot allocation method of an embodiment according to the present invention may comprise a step of adding a 'column' that is not allocated for a pilot subcarrier before the first OFDMA symbol of the pilot allocation structure of the 6*6 size of base tile (FIG. 16) or after the last OFDMA symbol of the pilot allocation structure of the 6*6 size of base tile (FIG. 15).

Alternatively, the pilot allocation method may comprise a step of copying a 'column' that is not allocated for pilot subcarriers from a pilot allocation structure of a 6*6 size of base tile, and a step of adding the copied 'column' before the first OFDMA symbol of the pilot allocation structure of the 6*6 size of base tile (FIG. 16) or after the last OFDMA symbol of the pilot allocation structure of the 6*6 size of base tile (FIG. 15).

In the pilot allocation structure shown in FIG. 15 and FIG. 16, the location where pilots for each antenna is allocated is represented in detail as follows:

<Pilot Allocation Index for FIG. 15>

Antenna 1

$I(k)=6k$, for OFDMA symbols where s is 0
$I(k)=6k+5$, for OFDMA symbols where s is 1
$I(k)=6k$, for OFDMA symbols where s is 4
$I(k)=6k+5$, for OFDMA symbols where s is 5

Antenna 2

$I(k)=6k+5$, for OFDMA symbols where s is 0
$I(k)=6k$, for OFDMA symbols where s is 1
$I(k)=6k+5$, for OFDMA symbols where s is 4
$I(k)=6k$, for OFDMA symbols where s is 5
where, $I(k)$: subcarrier index ($k=0, 1, \ldots$),
s: [OFDMA symbol index j] mod 7
(OFDMA symbol index $j=0, 1, 2, \ldots$)

<Pilot Allocation Index for FIG. 16>

Antenna 1

$I(k)=6k$, for OFDMA symbols where s is 1
$I(k)=6k+5$, for OFDMA symbols where s is 2
$I(k)=6k$, for OFDMA symbols where s is 5
$I(k)=6k+5$, for OFDMA symbols where s is 6

Antenna 2

$I(k)=6k+5$, for OFDMA symbols where s is 1
$I(k)=6k$, for OFDMA symbols where s is 2
$I(k)=6k+5$, for OFDMA symbols where s is 5
$I(k)=6k$, for OFDMA symbols where s is 6
where, $I(k)$: subcarrier index ($k=0, 1, \ldots$),
s: [OFDMA symbol index j] mod 7
(OFDMA symbol index $j=0, 1, 2, \ldots$)

In summary, embodiments 1-3 of the present invention shown in FIGS. 13-16 are improvements to the convention pilot allocation scheme shown in FIG. 9. A normal subframe of 4*6 matrix structure representing 4 subcarriers and 6 OFDMA symbols is defined for embodiment 4 to embodiment 6 for description. The subframe depicted in FIG. 10 or FIG. 11 serves as a normal subframe for embodiment 4 to embodiment 6. In these embodiments, an "OFDMA symbol column" (hereinafter referred to as a 'column') in the 6*6 size of normal subframe is copied and then added or inserted to the 6*6 size of normal subframe to construct a subframe comprised of 7 OFDMA symbols (i.e., an extended subframe); otherwise, a 'column' is removed from the 6*6 size of normal subframe to construct a subframe comprised of 5 OFDMA symbols (i.e., a reduced subframe).

Embodiment 4

FIG. 17 and FIG. 18 show pilot allocation structures for a subframe comprised of 5 OFDMA symbols (i.e., a reduced subframe).

To construct a subframe comprised of 5 OFDMA symbols (i.e., a reduced subframe), a pilot allocation method of an embodiment according to the present invention may comprise a step of removing a 'column' from the normal subframe described above. In this case, the third or the fourth column of the normal subframe is removed from the normal subframe. The pilot allocation depicted in FIG. 17 is constructed from the pilot allocation depicted in FIG. 10, and the pilot allocation depicted in FIG. 18 is constructed from the pilot allocation depicted in FIG. 11.

For FIG. 17, assuming l indicate OFDMA symbols in the subframe that comprises of 5 OFDMA symbols, the pilot subcarrier allocated in the i-th antenna, the OFDMA symbol of index l, and s-th tile is defined as follows:
$Pilot_i(s, 1) = 4s+i \bmod 2$, if $l \in \{0, 3\}$
$Pilot_i(s, 1) = 4s+i \bmod 2+2$, if $l \in \{1, 4\}$ In the pilot allocation structure shown in FIG. 18, the location where pilots for each antenna is allocated is represented in detail as follows:

<Pilot Allocation Index for FIG. 18>

Antenna 1

$I(k)=4k$, for OFDMA symbols where s is 0
$I(k)=4k+2$, for OFDMA symbols where s is 1
$I(k)=4k+1$, for OFDMA symbols where s is 3
$I(k)=4k+3$, for OFDMA symbols where s is 4

Antenna 2

$I(k)=4k+1$, for OFDMA symbols where s is 0
$I(k)=4k+3$, for OFDMA symbols where s is 1
$I(k)=4k$, for OFDMA symbols where s is 3
$I(k)=4k+2$, for OFDMA symbols where s is 4
where, $I(k)$: subcarrier index ($k=0, 1, \ldots$),
s: [OFDMA symbol index j] mod 5
(OFDMA symbol index $j=0, 1, 2, \ldots$)

Embodiment 5

FIG. 19 and FIG. 20 show pilot allocation structures for a subframe comprised of 7 OFDMA symbols (i.e., an extended subframe).

To construct a subframe comprised of 7 OFDMA symbols (i.e., an extended subframe), a pilot allocation method of an embodiment according to the present invention may comprise a step of inserting a 'column' that is not allocated for a pilot subcarrier to any place between the second OFDMA symbol and the fifth OFDMA symbol of the normal subframe.

Alternatively, the pilot allocation method of an embodiment according to the present invention may comprise a step of copying a 'column' that is not allocated for pilot subcarriers from a pilot allocation structure of a normal subframe, and a step of inserting the copied 'column' to any place between the second OFD-MA symbol and the fifth OFDMA symbol of the normal subframe.

The pilot allocation depicted in FIG. 19 is constructed from the pilot allocation depicted in FIG. 10, and the pilot allocation depicted in FIG. 20 is constructed from the pilot allocation depicted in FIG. 11.

For FIG. 19, assuming l indicates OFDMA symbols in the subframe that comprises of 5 OFDMA symbols, the pilot subcarrier allocated in the i-th antenna, the 1-th OFDMA symbol, and s-th tile is defined as follows:

Pilot$_i$(s, 1)=4s+i mod 2, if l∈{0, 5}
Pilot$_i$(s, 1)=4s+i mod 2+2, if l∈{1, 6}

In the pilot allocation structure shown in FIG. 20, the pilot allocation indexes for the antennas may be represented in detail as follows.

<Pilot Allocation Index for FIG. 20>

Antenna 1

I(k)=4k, for OFDMA symbols where s is 0
I(k)=4k+2, for OFDMA symbols where s is 1
I(k)=4k+1, for OFDMA symbols where s is 5
I(k)=4k+3, for OFDMA symbols where s is 6

Antenna 2

I(k)=4k+1, for OFDMA symbols where s is 0
I(k)=4k+3, for OFDMA symbols where s is 1
I(k)=4k, for OFDMA symbols where s is 5
I(k)=4k+2, for OFDMA symbols where s is 6
where, I(k): subcarrier index (k=0, 1, . . . ),
s: [OFDMA symbol index j] mod 7
(OFDMA symbol index j=0, 1, 2, . . . )

Embodiment 6

FIG. 21 to FIG. 24 show pilot allocation structures for a subframe comprised of 7 OFDMA symbols (i.e., an extended subframe).

To construct a subframe comprised of 7 OFDMA symbols (i.e., an extended subframe), a pilot allocation method of an embodiment according to the present invention may comprise a step of adding a 'column' that is not allocated for a pilot subcarrier before the first OFDMA symbol of the pilot allocation structure of the normal subframe (FIG. 23 or FIG. 24) or after the last OFDMA symbol of the pilot allocation structure of the normal subframe (FIG. 21 or FIG. 22).

Alternatively, the pilot allocation method of an embodiment according to the present invention may comprise a step of copying a 'column' that is not allocated for pilot subcarriers from a pilot allocation structure of a normal subframe, and a step of adding the copied 'column' before the first OFDMA symbol of the pilot allocation structure of the normal subframe (FIG. 23 or FIG. 24) or after the last OFDMA symbol of the pilot allocation structure of the normal subframe (FIG. 21 or FIG. 22).

The pilot allocations depicted in FIG. 21 and FIG. 23 are constructed from the pilot allocation depicted in FIG. 10, and the pilot allocations depicted in FIG. 22 and FIG. 24 are constructed from the pilot allocation depicted in FIG. 11.

In the pilot allocation structure shown in FIG. 21 to FIG. 24, the pilot allocation indexes for the antennas may be represented in detail as follows.

In FIG. 21, assuming l indicates OFDMA symbols in the subframe that comprises of 7 OFDMA symbols and l ∈ {0, 1, 4, 5}, the pilot subcarrier allocated in the i-th antenna, the 1-th OFDMA symbol, and s-th tile is defined as follows:

Pilot$_i$(s, 1)=4s+2·(1 mod 2)+i mod 2

In the pilot allocation structure shown in FIG. 22, the location where pilots for each antenna is allocated is represented in detail as follows:

<Pilot Allocation Index for FIG. 22>

Antenna 1

I(k)=4k, for OFDMA symbols where s is 0
I(k)=4k+2, for OFDMA symbols where s is 1
I(k)=4k+1, for OFDMA symbols where s is 4
I(k)=4k+3, for OFDMA symbols where s is 5

Antenna 2

I(k)=4k+1, for OFDMA symbols where s is 0
I(k)=4k+3, for OFDMA symbols where s is 1
I(k)=4k, for OFDMA symbols where s is 4
I(k)=4k+2, for OFDMA symbols where s is 5
where, I(k): subcarrier index (k=0, 1, . . . ),
s: [OFDMA symbol index j] mod 7
(OFDMA symbol index j=0, 1, 2, . . . )

For FIG. 23, assuming l indicates OFDMA symbols in the subframe that comprises of 7 OFDMA symbols and l ∈ {1, 2, 5, 6}, the pilot subcarrier allocated in the i-th antenna, the 1-th OFDMA symbol, and s-th tile is defined as follows.

<Pilot Allocation Index for FIG. 23>

Antenna 1

I(k)=4k, for OFDMA symbols where s is 1
I(k)=4k+2, for OFDMA symbols where s is 2
I(k)=4k, for OFDMA symbols where s is 5
I(k)=4k+2, for OFDMA symbols where s is 6

Antenna 2

I(k)=4k+1, for OFDMA symbols where s is 1
I(k)=4k+3, for OFDMA symbols where s is 2
I(k)=4k+1, for OFDMA symbols where s is 5
I(k)=4k+3, for OFDMA symbols where s is 6
where, I(k): subcarrier index (k=0, 1, . . . ),
s: [OFDMA symbol index j] mod 7
(OFDMA symbol index j =0, 1, 2, . . . )

In the pilot allocation structure shown in FIG. 24, the location where pilots for each antenna is allocated is represented in detail as follows:

<Pilot Allocation Index for FIG. 24>

Antenna 1

I(k)=4k, for OFDMA symbols where s is 1
I(k)=4k+2, for OFDMA symbols where s is 2
I(k)=4k+1, for OFDMA symbols where s is 5
I(k)=4k+3, for OFDMA symbols where s is 6

Antenna 2

I(k)=4k+1, for OFDMA symbols where s is 1
I(k)=4k+3, for OFDMA symbols where s is 2
I(k)=4k, for OFDMA symbols where s is 5
I(k)=4k+2, for OFDMA symbols where s is 6
where, I(k): subcarrier index (k=0, 1, . . . ),
s: [OFDMA symbol index j] mod 7
(OFDMA symbol index j =0, 1, 2, . . . )

In summary, the embodiments of the present invention shown in FIGS. 17, 19, 21, 23 are improvements to the conventional pilot allocations shown in FIG. 10; and the embodiments of the present invention shown in FIGS. 18, 20, 22 and 24 are improvements to the conventional pilot allocations shown in FIG. 11

Embodiments for 4 Tx system

Following embodiment 7 to embodiment 9 are for 4 Tx system.
A normal subframe of 18*6 matrix structure representing 18 subcarriers and 6 OFDMA symbols is defined for embodiment 10 to embodiment 12 for description. The subframe depicted in FIG. 12 serves as a normal subframe for embodiment 7 to embodiment 9. In these embodiments, an "OFDMA symbol column" (hereinafter referred to as a 'column') in the 6*6 size of normal subframe is copied and then added or inserted to the 6*6 size of normal subframe to construct a subframe comprised of 7 OFDMA symbols (i.e., an extended subframe); otherwise, a 'column' is removed from the 6*6 size of normal subframe to construct a subframe comprised of 5 OFDMA symbols (i.e., a reduced subframe).

Embodiment 7

FIG. 25 shows a pilot allocation structure for a subframe comprised of 5 OFDMA symbols (i.e., a reduced subframe).

To construct a subframe comprised of 5 OFDMA symbols (i.e., a reduced subframe), a pilot allocation method of an embodiment according to the present invention may comprise a step of removing a 'column' from the normal subframe described above. In this case, the third or the fourth column is removed from the normal subframe.

In the pilot allocation structure shown in FIG. 25, the pilot allocation indexes for the antennas may be represented in detail as follows.

Assuming l indicates OFDMA symbols in the subframe that comprises of 5 OFDMA symbols and $l \in \{0, 1, 3, 4\}$, the pilot subcarrier allocated in the i-th antenna, the l-th OFDMA symbol, and k-th PRU is defined as follows:

$$Pilot_i(k, l) = 18k + a_i$$

$$\text{If } l \in \{0, 1\}, a_i = \begin{cases} a_0 = 12 \cdot (l \bmod 2) \\ a_1 = 12 \cdot (l \bmod 2) + 5 \\ a_2 = 12 \cdot ((l+1) \bmod 2) \\ a_3 = 12 \cdot ((l+1) \bmod 2) + 5 \end{cases}$$

$$\text{If } l \in \{3, 4\}, a_i = \begin{cases} a_0 = 12 \cdot ((l+1) \bmod 2) + 5 \\ a_1 = 12 \cdot ((l+1) \bmod 2) \\ a_2 = 12 \cdot (l \bmod 2) + 5 \\ a_3 = 12 \cdot (l \bmod 2) \end{cases}$$

Embodiment 8

FIG. 26 shows a pilot allocation structure for a subframe comprised of 7 OFDMA symbols (i.e., an extended subframe).

To construct a subframe comprised of 7 OFDMA symbols (i.e., an extended subframe), a pilot allocation method of an embodiment according to the present invention may comprise a step of inserting a 'column' that is not allocated for a pilot subcarrier to any place between the second OFDMA symbol and the fifth OFDMA symbol.

Alternatively, the pilot allocation method of an embodiment according to the present invention may comprise a step of copying a 'column' that is not allocated for pilot subcarriers from a pilot allocation structure of a normal subframe, and a step of inserting the copied 'column' to any place between the second OFDMA symbol and the fifth OFDMA symbol of the normal subframe.

In the pilot allocation structure shown in FIG. 26, the pilot allocation indexes for the antennas may be represented in detail as follows.

Assuming l indicates OFDMA symbols in the subframe that comprises of 7 OFDMA symbols and $l \in \{0, 1, 5, 6\}$, the pilot subcarrier allocated in the i-th antenna, the l-th OFDMA symbol, and k-th PRU is defined as follows:

$$Pilot_i(k, l) = 18k + a_i$$

$$\text{If } l \in \{0, 1\}, a_i = \begin{cases} a_0 = 12 \cdot (l \bmod 2) \\ a_1 = 12 \cdot (l \bmod 2) + 5 \\ a_2 = 12 \cdot ((l+1) \bmod 2) \\ a_3 = 12 \cdot ((l+1) \bmod 2) + 5 \end{cases}$$

$$\text{If } l \in \{5, 6\}, a_i = \begin{cases} a_0 = 12 \cdot ((l+1) \bmod 2) + 5 \\ a_1 = 12 \cdot ((l+1) \bmod 2) \\ a_2 = 12 \cdot (l \bmod 2) + 5 \\ a_3 = 12 \cdot (l \bmod 2) \end{cases}$$

Embodiment 9

FIG. 27 and FIG. 28 show pilot allocation structures for a subframe comprised of 7 OFDMA symbols (i.e., an extended subframe).

To construct a subframe comprised of 7 OFDMA symbols (i.e., an extended subframe), a pilot allocation method of an embodiment according to the present invention may comprise a step of adding a 'column' that is not allocated for a pilot subcarrier before the first OFDMA symbol of the pilot allocation structure of the normal subframe (FIG. 28) or after the last OFDMA symbol of the pilot allocation structure of the normal subframe (FIG. 27).

Alternatively, the pilot allocation method of an embodiment according to the present invention may comprise a step of copying a 'column' that is not allocated for pilot subcarriers from a pilot allocation structure of a normal subframe, and a step of adding the copied 'column' before the first OFDMA symbol of the pilot allocation structure of the normal subframe (FIG. 28) or after the last OFDMA symbol of the pilot allocation structure of the normal subframe (FIG. 27).

In the pilot allocation structure shown in FIG. 27 and FIG. 28, the pilot allocation indexes for the antennas may be represented in detail as follows.

For FIG. 27, assuming l indicates OFDMA symbols in the subframe that comprises of 7 OFDMA symbols and $l \in \{0, 1, 4, 5\}$, the pilot subcarrier allocated in the i-th antenna, the l-th OFDMA symbol, and k-th PRU is defined as follows:

$Pilot_i(k, l) = 18k + 12 \cdot \{(1 + floor(i/2)) \bmod 2\} + 5 \cdot \{(i + floor(1/4)) \bmod 2\}$ For FIG. 28, assuming l indicates OFDMA symbols in the subframe that comprises of 7 OFDMA symbols and $l \in \{1, 2, 5, 6\}$, the pilot subcarrier allocated in the i-th antenna, the l-th OFDMA symbol, and k-th PRU is defined as follows:

Pilot$_i$(k, 1)=18k +12·{((l+1)+floor(i/2)) mod 2}+5·{(i+ floor(⅕)) mod 2}

In summary, embodiments 7-9 of the present invention shown in FIGS. 25-28 are improvements to the conventional pilot allocations of FIG. 12. These improvements are summarized below in Table 2.

TABLE 2

| The number of antennas | FIG. 25 | FIG. 26 | FIG. 27 | FIG. 28 |
|---|---|---|---|---|
| 1 | 4.444% | 3.174% | 3.174% | 3.174% |
| 2 | 8.888% (4.444% per stream) | 6.348% (3.174% per stream) | 6.348% (3.174% per stream) | 6.348% (3.174% per stream) |
| 4 | 17.776% (4.444% per stream) | 12.696% (3.174% per stream) | 12.696% (3.174% per stream) | 12.696% (3.174% per stream) |

Also, the pilot allocation structure of FIG. 27 provides better performance than the pilot allocation structure of FIG. 26 because the distance between pilot symbols is not increased, thereby not degrading channel estimation. Also, the pilot allocation structure of FIG. 27 is easier to implement than the pilot allocation structure of FIG. 28 in terms of interoperability/reduced complexity regarding backwards compatibility with conventional pilot allocations.

For all of the embodiments according to the present invention described above, a part of the pilot subcarriers for the transmission antennas may be used for common pilot, and the other part of the pilot subcarriers for the transmission antennas may be used for dedicated pilot. Alternatively, all of the pilot subcarriers for the transmission antennas may be used for common pilot, otherwise, all of the pilot subcarriers for the transmission antennas may be used for dedicated pilot.

Also, using data subcarriers other than pilot subcarriers that are contiguously allocated allows the data subcarriers to be contiguously paired by a multiple(s) of 2. As a result, a MIMO scheme of SFBC (space frequency block code) can be easily applied and common pilots and dedicated pilots are effectively applied. That is, by separating the pilot symbols as shown in at least one of the previously described embodiments, it is possible to employ a SFBC scheme. Also, by grouping the pilot signals as even pairs in the time domain, it is possible to employ an space time block code (STBC) scheme.

The previous discussion has included reference to OFDMA modulation. However, the present invention is also applicable to orthogonal frequency division multiplexing (OFDM) scenarios.

The above-described functions may be performed by a processor such as a microprocessor, a controller, a microcontroller or an application specific integrated circuit (ASIC) which is coded so as to perform the functions. The design, development and implementation of the code are apparent to those skilled in the art on the basis of the description of the present invention.

A method of allocating pilot subcarriers according to the present invention is applicable to an IEEE 802.16m system. As described above, a basic principle such as pilot arrangement for equally allocating transmission power to antennas or pilot shift pattern setting is also applicable to other wireless communication systems by the same method.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of signal processing at a wireless communication device, comprising:
   receiving an orthogonal frequency division multiple access (OFDMA) signal transmitted from a multiple input/ multiple output (MIMO) antenna system, wherein the OFDMA signal is received by using one or more resource blocks, each resource block being in a form of an 18*5 matrix representing 18 subcarriers and 5 OFDMA symbols; and
   performing channel estimation based on four pilot signals corresponding to four streams, wherein the four pilot signals are distributed across only a $1^{st}$, $2^{nd}$, $4^{th}$ and $5^{th}$ OFDMA symbol of the 5 OFDMA symbols,
   wherein, within each of the $1^{st}$, $2^{nd}$, $4^{th}$ and $5^{th}$ OFDMA symbols, a first occurring pilot subcarrier and a second occurring pilot subcarrier are separated by 4 subcarriers, the second occurring pilot subcarrier and a third occurring pilot subcarrier are separated by 6 subcarriers, and the third occurring pilot subcarrier and a fourth occurring pilot subcarrier are separated by 4 subcarriers, and
   wherein, within each of the $1^{st}$, $2^{nd}$, $4^{th}$ and $5^{th}$ OFDMA symbols, the first to fourth occurring pilot subcarriers are corresponding to the four streams.

2. The method of claim 1, wherein the 1st OFDMA symbol includes pilot subcarriers P0, P1, P2, and P3, and the pilot subcarriers P0, P1, P2 and P3 are the first, second, third and fourth occurring pilot subcarriers in the 1st OFDMA symbol.

3. The method of claim 2, wherein the pilot subcarriers P2, P3, P0 and P1 are the first, second, third and fourth occurring pilot subcarriers in the 2nd OFDMA symbol.

4. The method of claim 1, wherein the 4th OFDMA symbol includes pilot subcarriers P0, P1, P2, and P3, and the pilot subcarriers P1, P0, P3, and P2 are the first, second, third and fourth occurring pilot subcarriers in the 4th OFDMA symbol.

5. The method of claim 4, wherein the pilot subcarriers P3, P2, P1, and P0 are the first, second, third and fourth occurring pilot subcarriers in the 5th OFDMA symbol.

6. The method of claim 1, further comprising:
   MIMO post-processing an output of the step of performing channel estimation.

7. A mobile wireless communication device, comprising:
   a receiver configured to receive an orthogonal frequency division multiple access (OFDMA) signal transmitted from a multiple input/multiple output (MIMO) antenna system, wherein the OFDMA signal is received by using one or more resource blocks, each resource block being in a form of an 18*5matrix representing 18 subcarriers and 5 OFDMA symbols; and
   a channel estimator operatively connected to the receiver and configured to estimate channel characteristics based on four pilot signals corresponding to four streams, wherein the four pilot signals are distributed across only a $1^{st}$, $2^{nd}$, $4^{th}$ and $5^{th}$ OFDMA symbol of the 5 OFDMA symbols,
   wherein, within each of the $1^{st}$, $2^{nd}$, $4^{th}$ and $5^{th}$ OFDMA symbols, a first occurring pilot subcarrier and a second occurring pilot subcarrier are separated by 4 subcarriers, the second occurring pilot subcarrier and a third occurring pilot subcarrier are separated by 6 subcarriers, and the third occurring pilot subcarrier and a fourth occurring pilot subcarrier are separated by 4 subcarriers, and wherein, within each of the $1^{st}$, $2^{nd}$, $4^{th}$ and $5^{th}$ OFDMA symbols, the first to fourth occurring pilot subcarriers are corresponding to the four streams.

8. The mobile wireless communication device of claim 7, wherein the 1st OFDMA symbol includes pilot subcarriers P0, P1, P2 and P3, and the pilot subcarriers P0, P1, P2 and P3 are the first, second, third and fourth occurring pilot subcarriers in the 1st OFDMA symbol.

9. The mobile wireless communication device of claim 8, wherein the pilot subcarriers P2, P3, P0 and P1 are the first, second, third and fourth occurring pilot subcarriers in the 2nd OFDMA symbol.

10. The mobile wireless communication device of claim 7, wherein the 4th OFDMA symbol includes pilot subcarriers P0, P1, P2 and P3, and the pilot subcarriers P1, P0, P3, and P2 are the first, second, third and fourth occurring pilot subcarriers in the 4th OFDMA symbol.

11. The mobile wireless communication device of claim 10, wherein the pilot subcarriers P3, P2, P1, and P0 are the first, second, third and fourth occurring pilot subcarriers in the 5th OFDMA symbol.

12. The mobile wireless communication device of claim 7, further comprising:
 a MIMO post-processor operatively connected to the channel estimator and configured to post-process an output of the channel estimator.

* * * * *